United States Patent
Wang et al.

(10) Patent No.: US 10,936,307 B2
(45) Date of Patent: Mar. 2, 2021

(54) HIGHLIGHT SOURCE CODE CHANGES IN USER INTERFACE

(71) Applicant: International Business Machines Corporation, Armonk, NY (US)

(72) Inventors: Cheng Fang Wang, Shangdi (CN); Jin Zhang, Beijing (CN); Zhi Li Guan, Chang Ping District (CN); Qin Qiong Zhang, Beijing (CN); Shuang Men, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/199,314

(22) Filed: Nov. 26, 2018

(65) Prior Publication Data

US 2020/0167153 A1    May 28, 2020

(51) Int. Cl.
*G06F 8/73*   (2018.01)
*G06F 8/41*   (2018.01)
*G06F 16/34*  (2019.01)

(52) U.S. Cl.
CPC .............. *G06F 8/73* (2013.01); *G06F 8/427* (2013.01); *G06F 16/34* (2019.01)

(58) Field of Classification Search
CPC ... G06F 8/20; G06F 8/427; G06F 8/73; G06F 16/34; G06F 8/70
See application file for complete search history.

(56) References Cited

U.S. PATENT DOCUMENTS

| | | | |
|---|---|---|---|
| 8,276,118 B2 | 9/2012 | Chapman et al. | |
| 8,504,929 B2* | 8/2013 | Sullivan | G06F 8/38 715/760 |
| 8,943,423 B2 | 1/2015 | Merrill et al. | |
| 9,201,648 B2* | 12/2015 | Grant | G06F 8/34 |
| 9,348,563 B1* | 5/2016 | Xue | G06F 8/34 |
| 9,594,544 B2* | 3/2017 | Wang | G06F 8/38 |
| 9,703,553 B2 | 7/2017 | Bates et al. | |
| 9,734,040 B2* | 8/2017 | Gounares | G06F 11/3636 |
| 9,753,703 B2* | 9/2017 | Jemiolo | G09B 9/00 |
| 2004/0123186 A1* | 6/2004 | Kulp | G06F 8/38 714/38.1 |
| 2008/0235660 A1* | 9/2008 | Chapman | G06F 8/33 717/113 |
| 2008/0301661 A1* | 12/2008 | Haynes | G06F 8/65 717/170 |
| 2011/0010644 A1* | 1/2011 | Merrill | G06F 8/34 715/762 |

(Continued)

OTHER PUBLICATIONS

Anonymous; "Viewing Changes Information"; https://www.jetbrains.com/help/idea/viewing-changes-information.html; Retrieved: Aug. 2, 2018; 18 pages.

*Primary Examiner* — Phillip H Nguyen
(74) *Attorney, Agent, or Firm* — Cantor Colburn LLP; Teddi Maranzano

(57) ABSTRACT

According to one or more embodiments of the present invention a computer-implemented method includes determining a link between a user interface element and a portion of a source code. The method further includes detecting a change in the portion of source code in response to a code-check in. The method further includes highlighting the user interface element during a subsequent execution of the source code.

20 Claims, 12 Drawing Sheets

(56) References Cited

U.S. PATENT DOCUMENTS

| | | |
|---|---|---|
| 2012/0210298 A1 | 8/2012 | Hodgins et al. |
| 2015/0019178 A1 | 1/2015 | Creveling et al. |
| 2015/0205450 A1* | 7/2015 | Howett .................... G06F 8/38 |
| | | 715/747 |
| 2015/0220312 A1* | 8/2015 | Jemiolo ............. G09B 19/0053 |
| | | 715/234 |
| 2017/0212829 A1 | 7/2017 | Bales et al. |
| 2018/0107478 A1 | 4/2018 | Codato et al. |
| 2019/0369969 A1* | 12/2019 | Donohoe ................ G06F 9/455 |

\* cited by examiner

| UI element | Xpath | Impacting factors |
|---|---|---|
| Label1 | /books/name | variableName: label1 |
| Label2 | /books/price | variableName: label2 |
| text1 | /books/quantity | variableName: text1 |
| select | /books/payMode | variableName: select1<br>ImpactVariableName: Util.Constants1<br>ImpactMethodName: Util.getNameList |

```
800

<body bgcolor="#1E81C2" onload="javascript:focusOnUsername();" >
<form action="success.html" name="loginForm" >
<div id="loginFormMain">
<table style="width:468px;height:262px;background-color: gray;text-align: center;">
<tr>
    <th colspan="2" align="center" >Mangement Console</th>
</tr>
<tr>
    <td align="center">Name :<input type="text" style="width: 200px;height: 30px;" name="username"></td>
</tr>
<tr>
    <td align="center">Passwd:<input type="password" style="width: 200px;height: 30px;" name="password"></td>
</tr>
<tr>
    <td align="center">Site :
    <select name="sites" style="width: 200px;height: 30px;">
        <option value="Beijing">Beijing</option>
        <option value="Shanghai">Shanghai</option>
        <option value="Xian">Xian</option>
        <option value="Guangzhou">Guangzhou</option>
    </select>
    </td>
</tr>
<tr>
    <td align="center" ><input formmethod="post" type="submit" style="cursor: pointer;font-style: inherit;" name="submit"
    onclick="return checkLogin();" value="Login" >
    <input type="reset" style="cursor: pointer;" name=reset value="Reset"></td>
</tr>
</table>
</div>
</form>
</body>
```

FIG. 8

| UI element | Xpath | Impacting factors |
|---|---|---|
| Input[name=username] | /body/div[id=loginFormMain]/table/tr/td/input [value="username: "] | variableName: username |
| Input[name=password] | /body/div[id=loginFormMain]/table/tr/td/input [value="password: "] | variableName: password |
| Select[name=sites] | /body/div[id=loginFormMain]/table/tr/td/input[value="sites: "] | variableName: sites |

```html
<body bgcolor="#1E81C2" onload="javascript:focusOnUsername();" >
<form action="success.html" name="loginForm" >
<div id="loginFormMain">
<table style="width:468px;height:262px;background-color: gray;text-align: center;">
<tr>
    <th colspan="2" align="center" >Mangement Console</th>
</tr>
<tr>
    <td align="center">Name :<input type="text" style="width: 200px;height: 30px;" name="username"></td>
</tr>
<tr>
    <td align="center">Passwd:<input type="password" style="width: 200px;height: 30px;" name="password"></td>
</tr>
<tr>
    <td align="center">Phone :<input type="password" style="width: 200px;height: 30px;" name="password"></td>   ← 1010
</tr>
<tr>
    <td align="center">Site :
<select name="sites" style="width: 200px;height: 30px;" >
    <option value="Beijing">Beijing</option>
    <option value="Shanghai">Shanghai</option>
    <option value="Xian">Xian</option>
    <option value="Guangzhou">Guangzhou</option>
    *<option value="Guangzhou">Tianjin</option>*
</select>
</td>
</tr>
<tr>
    <td align="center" ><input formmethod="post" type="submit" style="cursor: pointer;font-style: inherit;" name="submit" onclick="return checkLogin();" value="Login" >
    <input type="reset" style="cursor: pointer;" name=reset value="Reset"></td>
</tr>
</table>
</div>
</form>
</body>
```

```
{
  "changeList":{
    "last_build_version":"20180716-072024.0",
    "current_build_version":"20180719-084624.0",
    "highlightType":"background"
    "color":"#FF0000"
    changeList{
      "ChangeElement":{
        "xpath": "/body/div[id=loginFormMain]/table/tr/td[value="phone:"]"
        "change_type":"add"
      }
      "ChangeElement":{
        "xpath": "/body/div[id=loginFormMain]/table/tr/td[value="Site:"/selection/option[value=Guangzhou]]"
        "change_type":"add"
      }
    }
  }
}
```

HIGHLIGHT SOURCE CODE CHANGES IN USER INTERFACE

BACKGROUND

The present invention relates to computing technology, and particularly to setting user interface indicators on a user interface when source code related to the user interface elements is changed. More particularly, embodiments of the present invention facilitate user interface development personnel to recognize which components to test.

In a typical system development that includes a computer program product, the development effort of the computer program product includes developers or programmers first writing source code, which includes computer executable instructions. The instructions when executed by a computer provides a user interface that facilitates users to interact with the system. Further, during the development of the computer program product, test engineers test the source code. The testing can include Functional Verification Testing (FVT), System Verification Testing (SVT), and/or Globalization Verification Testing (GVT). FVT generally refers to a stage of testing where an entity verifies that a User Interface (UI) functions the way it is designed to function. SVT generally refers to a stage of testing where an entity verifies that a UI works with any other computer program product that is included as part of the system being developed and sold. GVT refers to a stage of testing where an entity verifies that displayed text of a UI element accurately translates from a first language (e.g., English) to a second language of choice (e.g., Japanese). The phrase "User Interface (UI)", as used herein, refers to a visual interface that facilitates user-interactions for accomplishing pre-defined task(s) using the computer program product when executing on a computer.

SUMMARY

According to one or more embodiments of the present invention a computer-implemented method includes determining a link between a user interface element and a portion of a source code. The method further includes detecting a change in the portion of source code in response to a code-check in. The method further includes highlighting the user interface element during a subsequent execution of the source code.

According to one or more embodiments of the present invention, a computer program product includes a computer readable storage medium having stored thereon program instructions executable by one or more processing devices to perform a method. The method includes determining a link between a user interface element and a portion of a source code. The method further includes detecting a change in the portion of source code in response to a code-check in. The method further includes highlighting the user interface element during a subsequent execution of the source code.

According to one or more embodiments of the present invention a system includes a memory, a display, and a processor coupled with the memory and the display. The processor performs a method that includes determining a link between a user interface element and a portion of a source code. The method further includes detecting a change in the portion of source code in response to a code-check in. The method further includes highlighting the user interface element during a subsequent execution of the source code.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 8 depicts example source code according to an example scenario described for one or more embodiments of the present invention;

FIG. 9 depicts a backend-user interface mapping for exemplary user interface elements in the user interface of the computer program product represented by source code according to an example scenario described for one or more embodiments of the present invention;

FIG. 10 depicts revised source code according to an example scenario described for one or more embodiments of the present invention;

FIG. 11 depicts a mapping file according to an example scenario described for one or more embodiments of the present invention.

DETAILED DESCRIPTION

Figure 1:
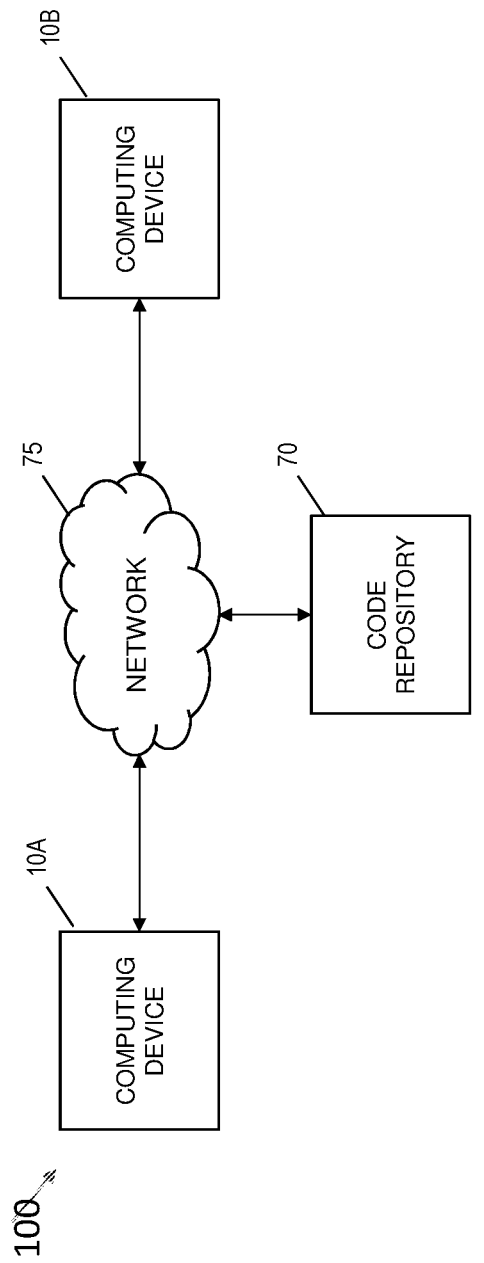
FIG. 1 depicts an example computer program product development system according to one or more embodiments of the present invention.

Test engineers often face various challenges when performing FVTs, SVTs, GVTs and/or other types of testing processes on a computer program product being developed. Particularly, various challenges occur between code drops. The phrase "code drop" refers to a stage when at least one software developer, or programmer, or other personnel completes an iteration of the computer program product and provides the product to persons that are to test the computer program product (e.g., software test engineers). Upon receipt of the new iteration of the computer program product, each group of software test engineers determines what parts of the computer program product need to be tested for defects. An exemplary defect occurs when a mouse click on a "FileOpen" button causes a software program to crash. These determinations generally involve identifying UI elements that have been added to the computer program product, identifying existing UI elements that have been changed, identifying existing UI elements that have been removed from the product, and/or identifying existing UI elements that have now been associated with different data/code in the backend.

Various conventional methods are typically employed by an entity to test a product for defects. One such conventional method generally involves utilizing a tool facilitating automated testing of UIs implemented in a product. For example, a software test engineer installs an iteration of a product on a Personal Computer (PC). Thereafter, the software test engineer runs a test software application. The test software application is typically operative to automatically move a mouse, click on graphical elements of Graphical User Interfaces (GUIs), enter text in text-based interfaces, and validate results of certain actions. The result validation is made using data indicating proper results for certain automated actions. This data is provided by the software test engineer. The automated test script is modified each time layout of graphical elements (e.g., buttons) is changed by the software developer.

Another conventional method is a "word of mouth" approach. This approach generally involves generating a list of features (e.g., a bookmark feature) that were implemented in the product by the software developer. The software developer provides the list of features to each group of software test engineers. Thereafter, the software test engineers test each feature identified in the list for defects.

Another conventional method is a Full Regression Test (FRT) approach. The FRT approach generally involves testing all functions of the computer program product so that function change, addition or removal in any new iterations are sure to be covered.

The conventional methods fail to address a technical challenge of visually identifying UI elements in the computer program product that have an associated change in the source code. Embodiments of the present invention address such technical challenges by facilitating UI flagging.

The phrase "UI flagging" generally refers to setting visual indicators on UI elements of a UI when code associated with the UI elements has changed from a previous iteration (or version) thereof. The code can be changed so that at least one of a visual characteristic, an auditory characteristic and a functional characteristic of a visual element is changed from a previous version thereof.

The visual characteristic includes, but is not limited to, a color scheme of a visual element, content of supporting text label(s) to be displayed with the visual element, a font size of the supporting text label, a font style of the supporting text label, and a pictorial representation to be displayed with the visual element. The auditory characteristic includes, but is not limited to, a sound output when certain events occur (e.g., when a visual element is displayed on a display screen and/or when a visual element is clicked by a user of a computing device). The functional characteristic includes, but is not limited to, an ability to cause certain event or acts to occur in response to certain user-software interactions (e.g., to cause a file to be transferred from a first storage device to a second storage device when a user clicks on a button). The UI elements include, but are not limited to, windows (or containers), buttons, check boxes, option buttons, sliders, list box, spinner, drop-down list, menus, toolbar, ribbon, combo boxes (e.g., text boxes with attached menus or list boxes), icons, tree views (or outline views), grid views (or data grids), tabs, scrollbars, and/or text boxes.

The visual indicators used for UI flagging facilitate software test engineers and other persons to visually distinguish any new UI paths that need to be tested for defects. The visual indicators also allow software test engineers and other persons to visually distinguish UI elements of a product that have backend source code that has been changed from UI elements of the product that do not have changed backend source code.

Implementation of embodiments of the present invention can be partitioned into three 3 main stages: code analysis, code change monitoring, and UI rendering. First, the source code is analyzed so that the UI elements (frontend code) are mapped to backend code in the source code. Code change monitoring detecting any code change in both, the backend and frontend, and further identifying which UI elements are affected by the change. When a new build of the source code is delivered for testing, an additional mapping file, such as a JSON file, XML file, or the like is also delivered. The mapping file includes mapping between the code changes and the UI elements that are affected. The UI rendering stage uses the mapping file, which facilitates marking which UI element has been changed and should be flagged when rendering the UI during execution of the new build. The mapping file, in one or more examples, also identifies the visual characteristics to use such as color, font, etc. to perform the UI flagging.

Accordingly, when the test engineer executes the new build of the computer program product, the UI renderer checks the mapping file and automatically finds and changes the UI element attributes for UI elements that are marked. In one or more examples, the mapping file is only be used when the new build is being executed for the first time, and the mapping file can be bypassed after that. Alternatively, or in addition, the test engineer can choose to load the mapping file in the UI renderer to perform the UI flagging.

Referring to the figures, FIG. 1 depicts an example computer program product development system according to one or more embodiments of the present invention. The development system includes one or more computing systems 10A that are used by software developers to write source code. The source code is stored in a code repository 70. In one or more examples, the code repository includes one or more builds of the computer program product, each build including one or more changes in the source code from a previous build. In one or more examples, computing systems 10B are used by test engineers to test one or more builds of the computer program product. The test engineers can access the source code from the code repository to perform the testing.

In one or more examples, the computing systems 10A, the code repository 70, and the computing systems 10B are coupled via a communication network 75. The communication network can be a wired/wireless network that facilitates the source code to be transferred from one component of the computer program product development system 100 to another.

It is understood that the number of components depicted in FIG. 1 is exemplary and that in other examples, the computer program product development system 100 can include different number of computing systems 10A for writing the source code, a different number of computing systems 10B for testing the source code, etc. further, it should be noted that although the computing systems 10A and 10B are shown separately, in one or more examples, testing can be performed on the same computing system 10 that is used to write the source code.

Figure 2:
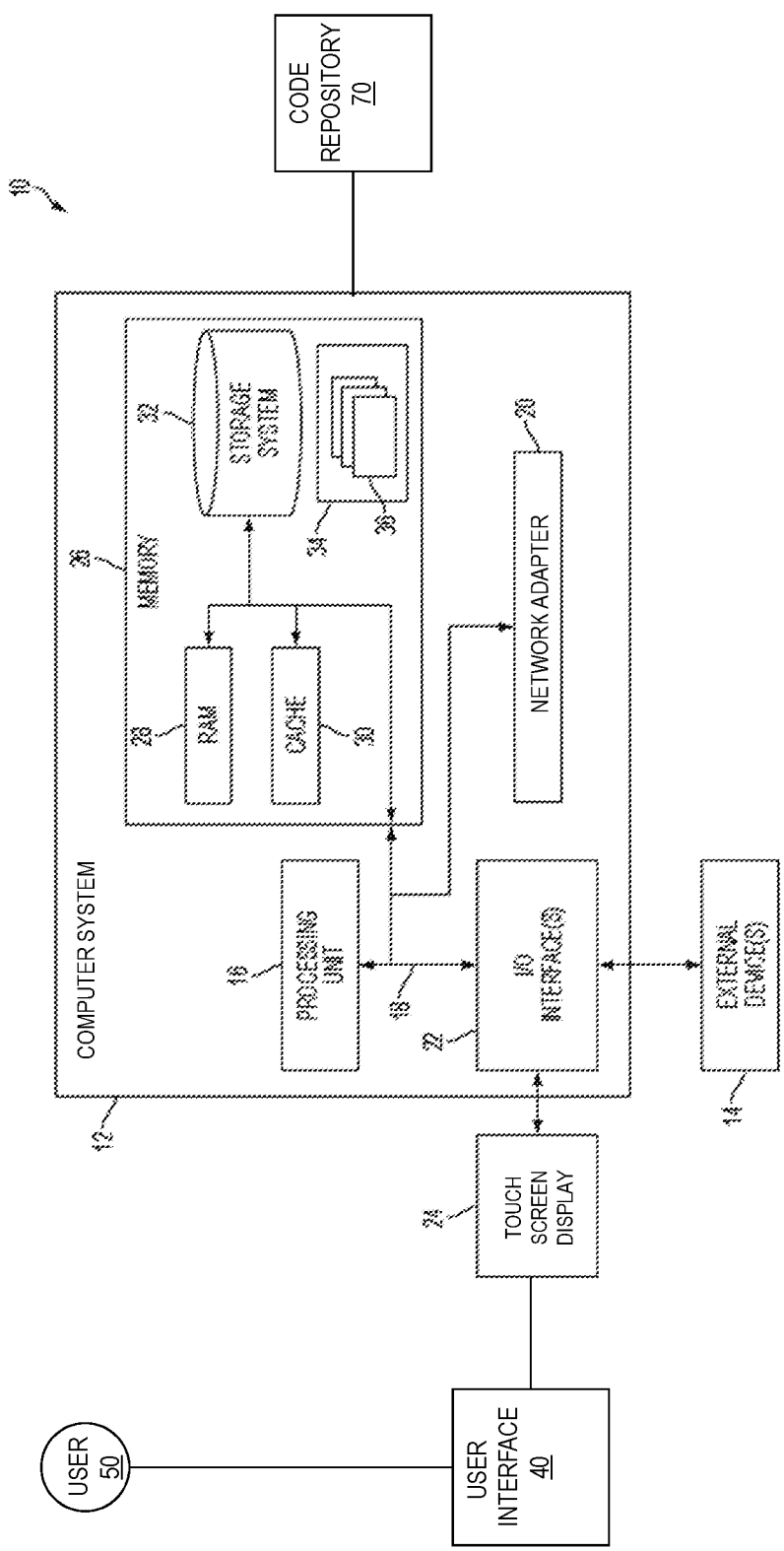
FIG. 2 depicts a schematic of an example of a system according to one or more embodiments of the present invention.

FIG. 2 depicts a schematic of an example of a computing system 10 according to one or more embodiments of the present invention. The depicted computing system 10 can be used either as the computing system 10A or the computing system 10B as depicted in FIG. 1. Further, it should be noted that depicted computing system 10 is only one example of a suitable computing system and is not intended to suggest any limitation as to the scope of use or functionality of embodiments of the invention described herein.

The system 10 includes a computer system 12 that facilitates executing one or more builds of a computer program product from the source code repository 70. A user 50 can be a testing engineer. The user 50 interacts with the computer program product via a user interface 40 via a display 24. The user interface 40 can update in a synchronous or asynchronous manner.

The computer system 12 can be operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile devices, smartphone, personal digital assistant, media player, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 12 in system 10 is shown in the form of a general-purpose computing device. The components of computer system 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 26 can include computer system readable media in the form of volatile memory, such as random access memory (RAM) 28 and/or cache memory 30. Computer system 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, web browser, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

The computer system 12 can facilitate the user 50 to access the user interface 40 of the computer program product. The computer program product can execute locally on the computer system 12. The user interface 40 has a layout that includes positions and sizes of one or more user interface elements.

Figure 3:
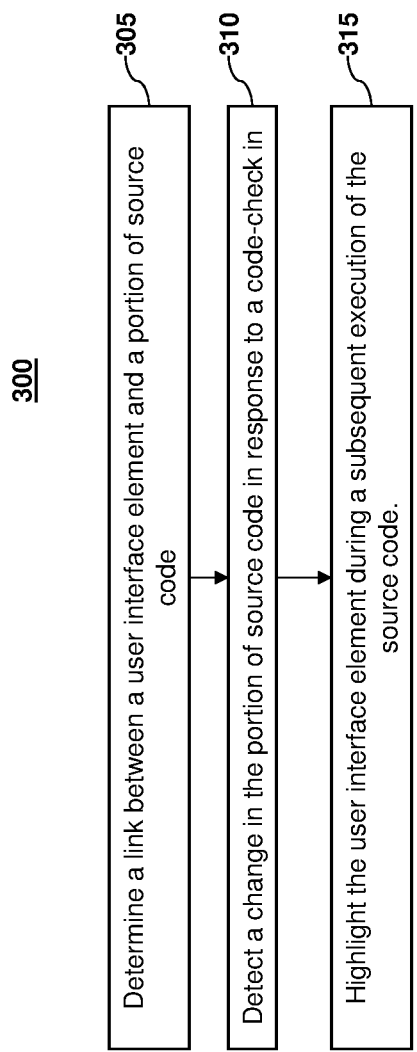
FIG. 3 illustrates a flowchart of an example method for user interface flagging according to one or more embodiments of the present invention.

FIG. 3 illustrates a flowchart of an example method for user interface flagging according to one or more embodiments of the present invention. The depicted method 300 includes determining a link between a user interface element and a portion of source code from the computer program product stored in the source code repository 70 (305). The mapping can be performed by scanning the source code and identifying identifiers of one or more user interface elements in the source code. Further, portions of source code are identified that are linked to the user interface elements based on the portions of source code including the identifiers of the user interface elements. In one or more examples, the link is identified between one or more variables and/or data elements that are displayed using the user interface element.

The method 300 further includes detecting a change in the portion of source code in response to a code-check in (310). The code-check in is when one or more programmers edit source code in the source code repository. If the portion of the source code that is linked to the user interface element has changed, during a subsequent execution of the computer program product, the user interface element is flagged by highlighting the user interface element during the subsequent execution of the source code (315). The highlight can include an alteration in the visual characteristics of the user interface element.

Figure 4:
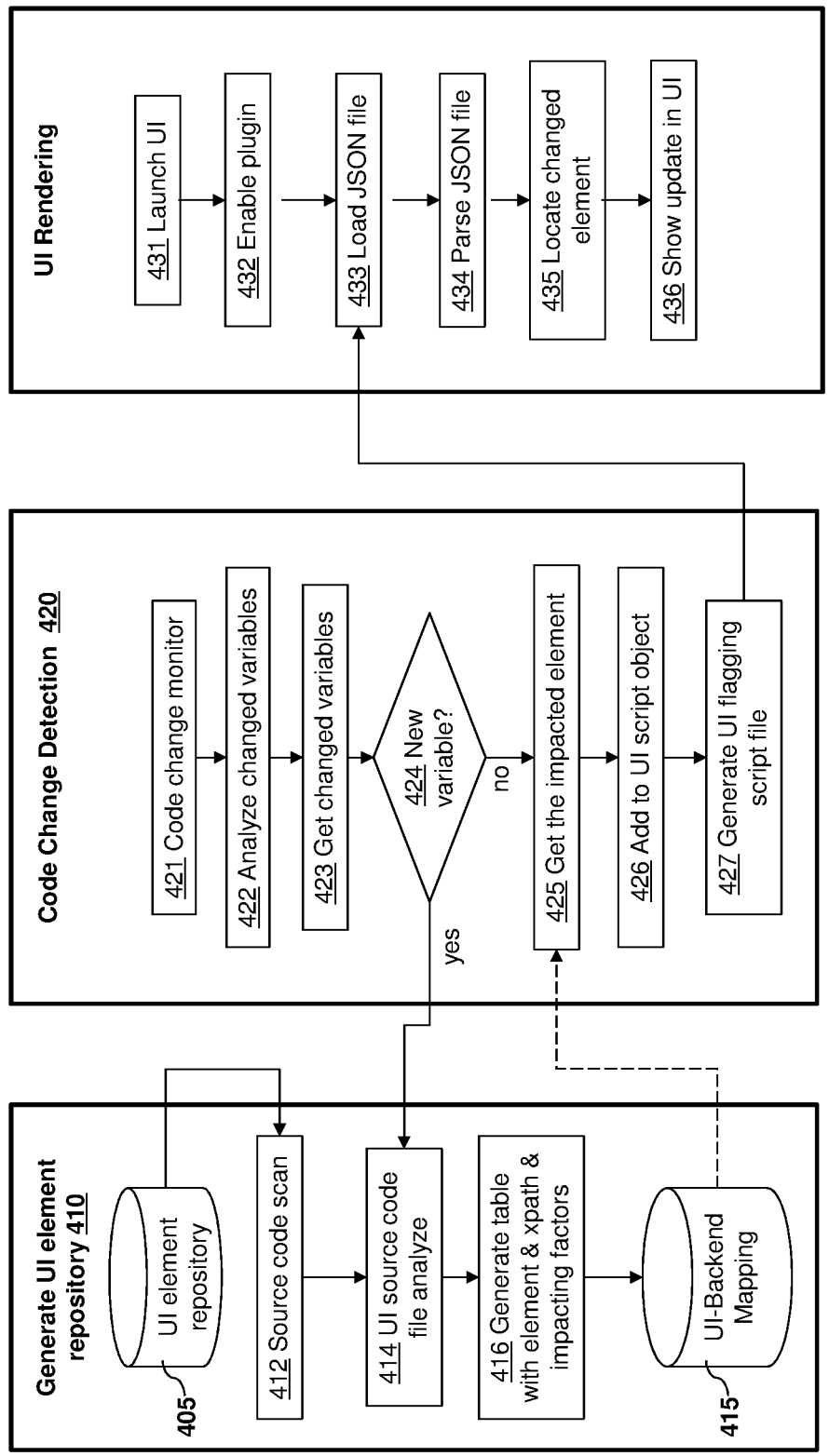
FIG. 4 illustrates a flowchart of an example method for user interface flagging according to one or more embodiments of the present invention.
Figure 5:
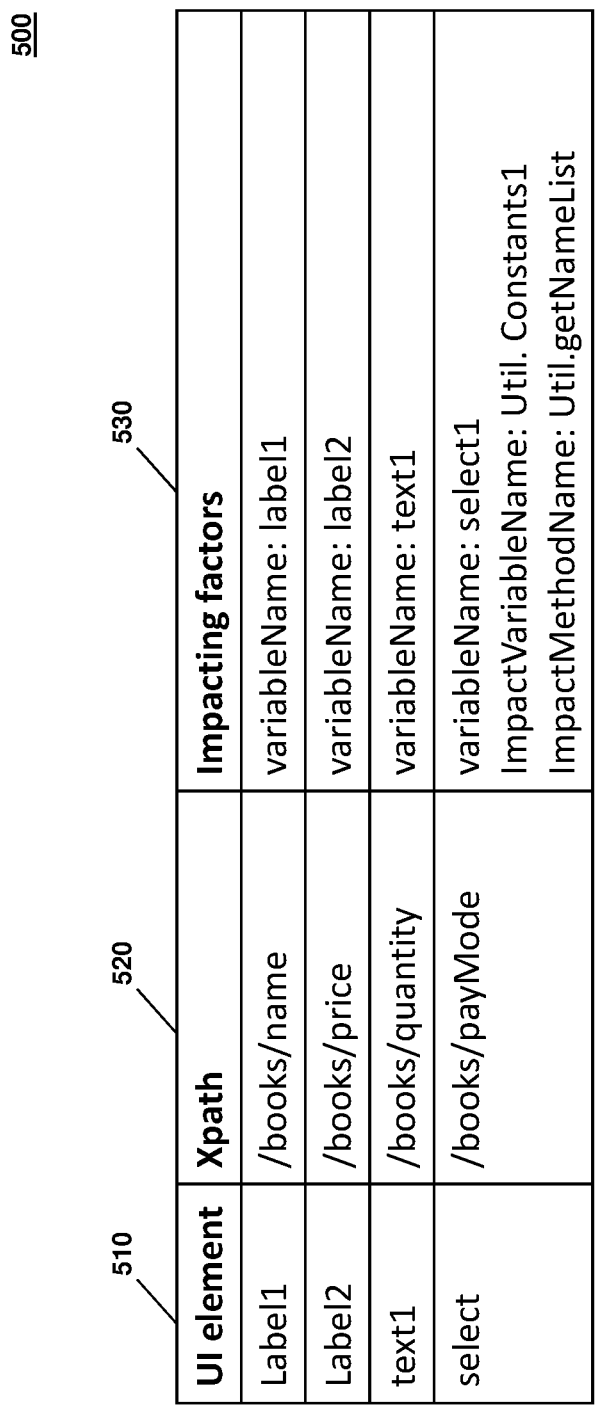
FIG. 5 depicts an example user interface-backend mapping according to one or more embodiments of the present invention.

FIG. 4 illustrates a flowchart of an example method for user interface flagging according to one or more embodiments of the present invention. The method 400 that is depicted includes a generating a user interface element repository 405 (410). Here, the source code in a build for the computer program product is divided into 2 categories: backend and frontend. Because the goal is to highlight frontend user interface change, code is scanned (412) and analyzed (414) to find out all user interface elements in the source code and relate them with backend source code. This mapping or linking of the backend code with the frontend code helps determine which user interface element is affected when a portion of backend code changes (416). After the analysis, the mapping between the frontend code and backend code are stored in a database 415. In one or more examples, the database 415 includes a user interface-backend mapping that can be stored in the form of a table FIG. 5 depicts an example user interface-backend mapping according to one or more embodiments of the present invention. The depicted mapping 500 includes identifiers of the user interface elements that are identified during the code scan (412) and an hierarchy path 520 for each of the user interface elements. The hierarchy path can be an "xpath" that identifies a hierarchy of the user interface elements in the source code. XPath (XML Path Language) is a query language for selecting nodes from an XML, document. Accordingly, if the user interface source code is represented using XML, the xpath of the user interface can be used as the hierarchy path 520. The mapping 500 further includes impact factors 530 for each user interface element. A set of impact factors 530 corresponding to each of the user interface elements 510 includes names of one or more variables in the source code that affect the rendering of that user interface element. For example, in the case shown in FIG. 5, content stored in the variables named "label1", "label2", and "text1" are displayed by the corresponding user interface elements "LABEL1", "LABEL2", and "TEXT1". Further, a user interface element named "SELECT" is affected by the contents of a variable named "select1", which can include a list of options that the user 50 can select from during runtime. In addition, the user interface element "SELECT" is also affected by variables "Util. Constants1" and "Util.getNameList."

Referring to the flowchart of FIG. 4, a code change analysis is performed to detect if the source code checked in to the source code repository 70 includes any changes to any one of the portions of code that affect one or more user interface elements 510 that are mapped to the backend variables (420). Detecting the code changes includes monitoring and identifying what portions of the source code are modified during the code-check in (421).

Further, changed variables are analyzed (422). This includes parsing the changed portions of the code to drill down, and identify methods or variables that reference one or more user interface elements from the repository 405.

If the variable or method that references a user interface element is newly added (424) during the present code-check in, the method includes analyzing the frontend code and the backend code for the identified portion of source code to update the mapping 415. If the variable is an existing variable that has a changed value in this code-check in, the mapping 415 need not be updated; rather, an entry for the referenced user interface element is identified in the mapping 415 (425).

The entry for the user interface element is converted to a user interface script object (426) and a user interface flagging script is generated using the user interface script object (427). The user interface flagging script includes source code that a user interface renderer uses to highlight the user interface element that was referenced by the changed backend source code, as will be described further. In one or more examples, the user interface flagging script includes the details of the user interface element that is to be highlighted along with one or more visual characteristics to alter to create the highlighting effect. These operations can be performed for each user interface element that is linked with changed portions of the source code so that the user interface flagging script includes a list of the user interface elements that are to be highlighted.

Figure 6:
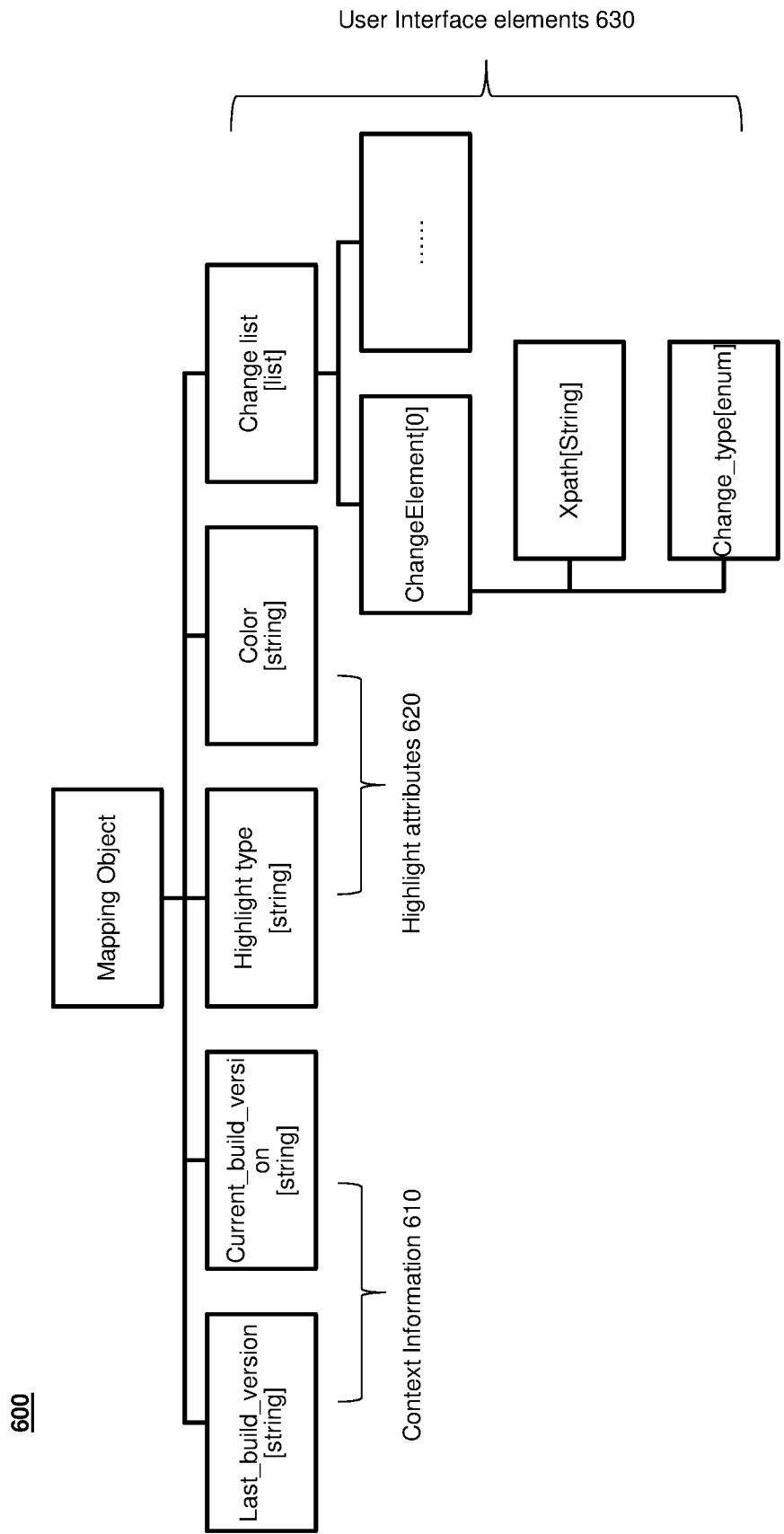
FIG. 6 depicts an example structure of a user interface flagging script according to one or more embodiments of the present invention.

FIG. 6 depicts an example structure of a user interface flagging script according to one or more embodiments of the present invention. In one or more examples, the user interface flagging script file (mapping file) 600 can be a JSON script or an XML script. For example, a JSON file is prepared to mark a list of user interface elements 630, which are associated with backend source code that has been changed so that the user interface elements are to be highlighted. The JSON file also identifies the highlight attributes 620 such as color, font, etc. In addition, context information 610 is also stored in JSON file to identify the build of the computer program product, the xpath of the user interface elements, and the like.

In one or more examples, the user interface flagging script file 600 is provided to the user 50 along with a computer program product build. Referring to the flowchart in FIG. 4, the execution of the new build of the computer program product initiates a launch of the user interface of the computer program product (431). Typically, a user interface renderer (or user interface engine) renders the one or more user interface elements in the user interface of the computer program product.

In the case of the user 50 being a software test engineer, a separate plugin is enabled that facilitates user interface flagging (432). The plugin is preconfigured to parse the source code in the user interface flagging script file 600 including the one or more mapping objects. The plugin loads the user interface flagging script file 600 (433).

The user interface flagging script file 600 can record a number of times it has been used. In one or more examples, the user interface flagging script file 600 can only be used once, during a subsequent execution of a build of the computer program product after a code check-in. The user interface renderer can bypass the user interface flagging script file 600 if the user 50 choose to ignore the user interface element changes. Alternatively, or in addition, the user 50 can choose to have the user interface renderer highlight the user interface element changes on additional executions of the computer program product. Alternatively, or in addition, the plugin maintains the number of times a particular user interface flagging script file 600 is used.

The plugin parses the source code in the user interface flagging script file 600 (434). Further, the plugin identifies, automatically, the visual attributes of the user interface elements in the source code from the new build (435). The plugin overrides and changes the attributes of the user interface elements in the source code to those from the user interface flagging script file 600. Accordingly, the user interface renderer when rendering the user interface elements identified in the user interface flagging script file 600, uses the overridden visual attributes (436). The user interface elements are accordingly flagged in this manner when the user 50 interface flagging script file is being used for the first time since the user 50 accesses the user interface.

Figure 7:
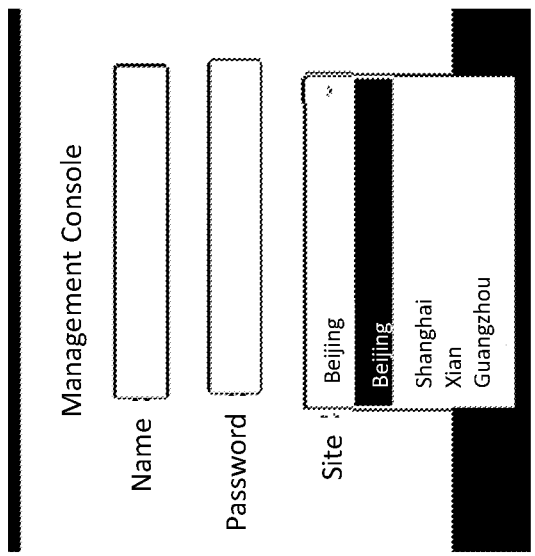
FIG. 7 depicts a user interface of source code that is represented in FIG. 8, according to an example scenario described for one or more embodiments of the present invention.

An example scenario of using one or more embodiments of the present invention is now discussed. FIG. 7 depicts a user interface 700 of source code 800 that is represented in FIG. 8. FIG. 9 depicts a backend-user interface mapping 900 for exemplary user interface elements in the user interface 700 of the computer program product represented by the source code 800.

FIG. 10 depicts revised source code 800B. The revisions 1010, compared to the source code 800, are marked in FIG. 10. Using one or more embodiments of the present invention, it is deemed that the changed source code 800B includes a user interface impact changes based on code analysis result. Accordingly, the mapping object is created, such as a JSON object shown in FIG. 11. The mapping object 1100 identifies that a new user interface element ("phone") is added as well as that a user interface element ("site") is changed. The mapping object 11 also includes additional information such as the context information.

Figure 12:
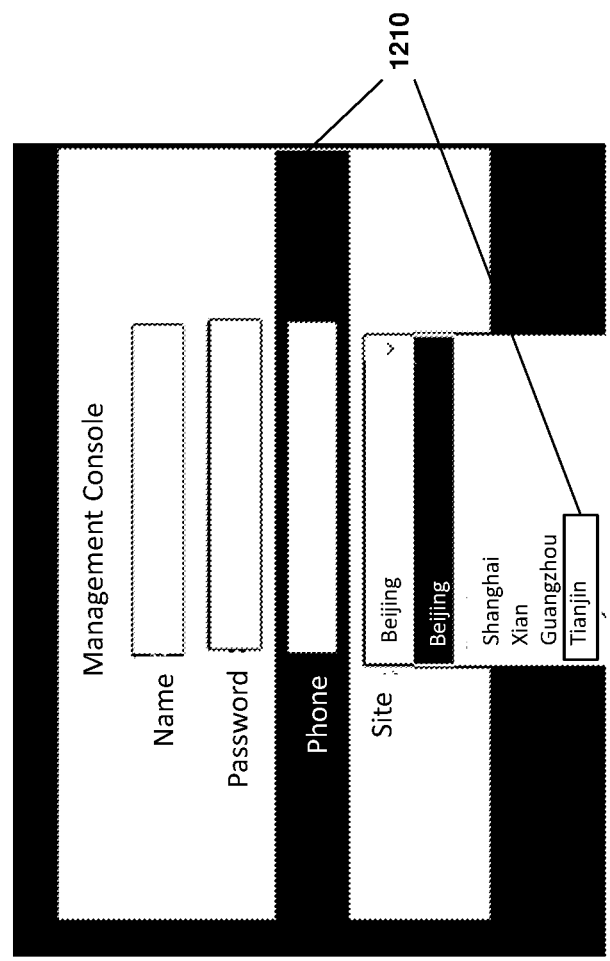
FIG. 12 depicts a revised user interface with user interface flagging according to one or more embodiments of the present invention.

FIG. 12 depicts a revised user interface 700B of the revised source code 800B that is represented in FIG. 10. The revised user interface 700B is depicted using the JSON object 1100 from FIG. 11. Using the highlight attributes from the JSON object 1100 the user interface elements corresponding to the revisions 1010 are flagged (1210) in the revised user interface 700B. As can be seen, a first user interface element is flagged (1210) using first visual attributes, such as a background color, whereas a second user interface element is flagged using second visual attributes, such as a border color (1210).

Accordingly, one or more embodiments of the present invention facilitate identifying user interface element by highlighting the user interface element in a rendered user interface during runtime based on changes in source code. One or more embodiments of the present invention facilitate automatically detecting and highlighting the user interface elements when rendering the user interface. In one or more examples, the changes are highlighted in a subsequent execution of the source code after a code-check in. One or more embodiments of the present invention are directed to improvements in computing technology, and particularly in the field of software development, and more particularly software testing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. "Java" and all Java-based trademarks and logos are trademarks or registered trademarks of Oracle and/or its affiliates.

What is claimed is:

1. A computer-implemented method comprising:
   during a development of a software product, determining, from a source code of the software product, a link between a first user interface element and a first portion of the source code, and between a second user interface element and a second portion of the source code;
   during the development of the software product, detecting a change in the first portion of the source code in response to a code-check in of the source code, the second portion of the source code being unchanged, wherein the change in the first portion of the source code causes a change in content of the first user interface element; and
   during testing of the software product, rendering, during a subsequent execution of the software product, the subsequent execution is for testing the source code, the first user interface element corresponding to the first portion of the source code, and the second user interface element corresponding to the second portion of the source code, wherein the rendering comprises highlighting only the first user interface element that has the change in the content.

2. The computer-implemented method of claim 1, wherein highlighting the first user interface element comprising:
   generating a separate source code for highlighting the first user interface element.

3. The computer-implemented method of claim 2, wherein the separate source code generated is stored in a mapping file that is provided to a user interface renderer during the subsequent execution of the source code.

4. The computer-implemented method of claim 2, wherein the separate source code is parsed and executed at runtime to highlight the first user interface element.

5. The computer-implemented method of claim 2, wherein the generated separate source code comprises one or more visual settings for the first user interface element, the visual settings overriding configured visual settings from the source code.

6. The computer-implemented method of claim 1, wherein determining the link between a user interface element and a corresponding portion of source code comprises:
   determining an identifier of the user interface element by parsing a first source code file comprising source code for the user interface element;
   analyzing the portion of the source code by parsing a second source code file comprising the portion of the source code, which comprises one or more variables and/or parameter values; and identifying the user interface element being associated with portion of source code based on a determination that the portion of source code includes the identifier of the user interface element to display the one or more variables and/or parameter values.

7. The computer-implemented method of claim 1, wherein the first user interface element is newly added during the code-check in.

8. The computer-implemented method of claim 1, wherein the first user interface element is linked with the first portion of source code that comprises an updated list of data elements to be displayed using the first user interface element.

9. A computer program product comprising a computer readable storage medium having stored thereon program instructions executable by one or more processing devices to perform a method comprising:
   during a development of a software product, determining, from a source code of the software product, a link between a first user interface element and a first portion of the source code, and between a second user interface element and a second portion of the source code;
   during the development of the software product, detecting a change in the first portion of the source code in response to a code-check in, the second portion of the source code being unchanged, wherein the change in the first portion of the source code causes a change in content of the first user interface element; and
   during testing of the software product, rendering, during a subsequent execution of the software product for testing the source code, the first user interface element corresponding to the first portion of the source code, and the second user interface element corresponding to the second portion of the source code, wherein the rendering comprises highlighting only the first user interface element that has the change in the content.

10. The computer program product of claim 9, wherein highlighting the user interface element comprising:
    generating a separate source code for highlighting the user interface element.

11. The computer program product of claim 10, wherein the separate source code generated is stored in a mapping file that is provided to a user interface renderer during the subsequent execution of the source code.

12. The computer program product of claim 10, wherein the separate source code is parsed and executed at runtime to highlight the first user interface element.

13. The computer program product of claim 10, wherein the generated separate source code comprises one or more visual settings for the user interface element, the visual settings overriding configured visual settings from the source code.

14. The computer program product of claim 9, wherein determining the link between the first user interface element and the first portion of source code comprises:
    determining an identifier of the first user interface element by parsing a first source code file comprising source code for the first user interface element;
    analyzing the first portion of the source code by parsing a second source code file comprising the first portion of the source code, which comprises one or more variables and/or parameter values; and
    identifying the first user interface element being associated with first portion of source code based on a determination that the first portion of source code includes the identifier of the first user interface element to display the one or more variables and/or parameter values.

15. The computer program product of claim 9, wherein the first user interface element is newly added during the code-check in.

16. A system comprising:
    a memory;
    a display; and
    a processor coupled with the memory and the display, the processor configured to perform a method comprising:
       during a development of a software product, determining, from a source code of the software product, a link between a first user interface element and a first portion of the source code, and between a second user interface element and a second portion of the source code;
       during the development of the software product, detecting a change in the first portion of the source code in response to a code-check in, the second portion of the source code being unchanged, wherein the change in the first portion of the source code causes a change in content of the first user interface element; and
       during testing of the software product, rendering, during a subsequent execution of the software product for testing the source code, the first user interface element corresponding to the first portion of the source code, and the second user interface element corresponding to the second portion of the source code, wherein the rendering comprises highlighting only the first user interface element that has the change in the content.

17. The system of claim 16, wherein highlighting the user interface element comprising:
    generating a source code for highlighting the user interface element.

18. The system of claim 17, wherein the separate source code that is generated is stored in a mapping file that is provided to a user interface renderer during the subsequent execution of the source code.

19. The system of claim 17, wherein the generated separate source code comprises one or more visual settings for the first user interface element, the visual settings overriding configured visual settings from the source code.

20. The system of claim 16, wherein determining the link between a user interface element and a corresponding portion of source code comprises:
    determining an identifier of the user interface element by parsing a first source code file comprising source code for the user interface element;
    analyzing the portion of the source code by parsing a second source code file comprising the portion of the source code, which comprises one or more variables and/or parameter values; and
    identifying the user interface element being associated with portion of source code based on a determination that the portion of source code includes the identifier of the user interface element to display the one or more variables and/or parameter values.

* * * * *